INVENTORS
LESTER M. SPANDORFER
ALBERT B. TONIK
SHIMON EVEN
BY William E. Cleaver
ATTORNEY United States Patent Office 3,407,357
Patented Oct. 22, 1968

3,407,357

PLANAR INTERCONNECTING NETWORK AVOIDING SIGNAL PATH CROSSOVERS

Lester M. Spandorfer, Cheltenham, and Albert B. Tonik, Dresher, Pa., and Shimon Even, Haifa, Ahuza, Israel, assignors to Sperry Rand Corporation, New York, N.Y., a corporation of Delaware Continuation-in-part of application Ser. No. 346,570, Feb. 21, 1964. This application Jan. 21, 1966, Ser. No. 522,250
1 Claim. (Cl. 328—92)

ABSTRACT OF THE DISCLOSURE

The present device provides a logic network connected and located at each essential crossover of a transmission network which enables the terminals of a first associated pair of terminals to be connected to one another without requiring that the medium which connects them should cross over the medium which connects the terminals of any other pair of associated terminals in the network.

This is a continuation-in-part of United States Patent application, Ser. No. 346,570, filed Feb. 21, 1964, now Patent No. 3,248,573. The present invention relates to interconnecting signal arrangement for energy transmission systems, and, in particular, to planar connecting arrangements.

The present invention is described in connection with an electrical system for simplicity but it should be noted that the invention can be employed with other energy transmission systems such as light systems, pneumatic systems and the like.

When a number of electrical components, such as electrical circuit cards in a computer, are joined together to form a system, these components must be interconnected with one another.

The procedure for interconnecting these components has followed several techniques. In each of these techniques the circuit component sub-assemblies have been connected onto one side of an assembly board and the interconnecting wires are connected on the other side of the assembly board, often referred to as the backboard.

Probably the most straightforward technique is that of hand wiring one terminal with another on the backboard side, and indeed this has been the procedure in many prior art electrical systems such as computers. It takes very little imagination to envision that the hand wiring of such electrical terminals demands that a great deal of space be allotted to house the many wires which are criss-crossed in any random pattern from one terminal to another. It is also easy to envision that the time consumed in hand wiring a system is significant, and the problems which arise in servicing such computers, because of the random intermeshing of the wires, are manyfold.

The initial improvement on such a random hand wiring scheme resulted in grouping the wires into cable form. The cables provided a little more semblance of organization than with the heretofore described random wiring. Nonetheless even the cable technique demanded a great deal of space and a great deal of time. The next step in the improvement of the interconnecting schemes was the introduction of multi-layered printed circuits. The multi-layered printed circuit arrangement provides for interconnecting the circuit cards or circuit sub-assemblies by providing printed circuits from one treminal to another, or from certain terminals to other terminals on one layer and from yet other terminals to associated terminals on another layer. This arrangement provides a multi-layered package secured to the backboard in place of the wires just described. If a component circuit terminal to be connected were to go to some other component circuit terminal but their connection would require a crossover on one layer, the interconnecting printed circuits would provide connections through the substrates, upon which they were bonded, to provide an interconnecting path without a crossover. While such schemes do have merit, the connections through the substrates have proven to be unreliable in a number of applications, and therefore have been the subject of much research for improvement.

If the multi-layer printed circuit arrangement is considered for the moment, it will be realized that a large number of the circuit portions which pass through the substrates are portions which represent essential cross-over of the connecting wires or connecting media although some of the interconnections through the substrates are the result of using wires of finite widths which won't fit on one surface. In other words, when treminals in a system are being connected, one to another (even through the connections are carefully planned so that the connections between the terminals will not include unnecessary cross-overs), there always result situations where the only way by which one terminal can be connected with a second terminal is to have the connecting wire therebetween actually cross over or lie across another wire connecting two other points. In a multi-layer printed circuit arrangement the essential crossovers are fabricated characteristic in that the metal through the substrates However, the solution itself, i.e., the conducting paths through the substrates, produces a somewhat undesirable characteristic in that the metal through the substrates is difficult to bond with the circuits lying on top of the substrate. Therefore, the multi-layer printed circuit schemes according to the present state of the art have proven to be unreliable in a number of applications.

In contrast, the present invention provides a means for interconnecting a plurality of terminals to form a system wherein the interconnection is on one plane, and there are no crossovers.

Accordingly, it is an object of the present invention to provide an improved interconnecting network for an energy transmitting system, and in a preferred embodiment for an electrical system.

It is a further object of the present invention to provide an interconnecting network for an energy transmitting system which is planar and operates without any crossovers of the media respectively connecting two pairs of terminals at an essential crossover point.

In accordance with a feature of the present invention at each essential crossover location there is provided a logic network which enables the terminals of a first associated pair of terminals to be connected to one another without requiring that the medium which connects them should cross over the medium which connects the terminals of a second associated pair of terminals.

In accordance with the foregoing feature of the present invention the logic network, last mentioned, effects an energy transmission between adjacent terminals, hereinafter referred to as a right angular energy transmission, to simulate or effect a transmission of energy between opposite terminals.

The above mentioned and other features and objects of this invention will become more apparent by reference to the following description of an embodiment of the invention taken in conjunction with the accompanying drawings wherein.

When an electrical system is interconnected, i.e., when the various electrical components are wired together to form a system, the connecting leads are positioned such that a number of essential crossovers result. An essential crossover should be understood to mean a necessary overlaying (or an apparent necessary overlaying) of a first lead on a second lead in order that the first lead can connect two electrical terminals which lie along a first imaginary line which cuts a second imaginary line lying between the two terminals that the second lead connects. When the interconnection network of an electrical system is first laid out, it may be that many leads cross over one another, but by re-routing the leads many of these crossovers can be eliminated, allowing only the essential crossovers to remain. Essential crossovers may be only apparently necessary because the present invention provides for their elimination.

Figure 1:
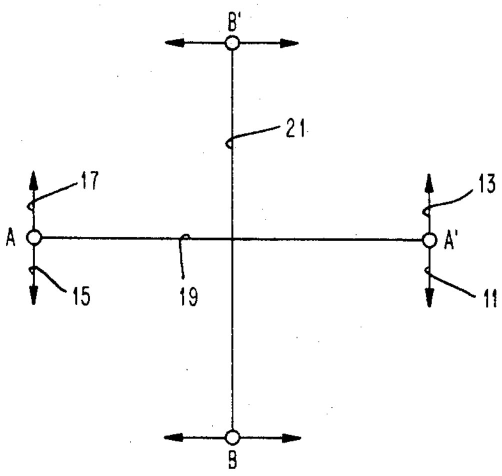
FIGURE 1 is a schematic diagram of an essential crossover of connecting media between four terminals.

The foregoing concept can be better understood by examining FIGURE 1 which shows four terminals A–A′ and B–B′. Assume that when the circuit cards (groups of electrical components) of a computer have been mounted on a single plane and wired together there remain four terminals or printed circuit leads A–A′ and B–B′ unconnected. Assume that this signal system necessitates that A be connected to A′ and B be connected to B′ in order to properly complete the interconnection of the circuit cards. Further assume that no other paths are possible. In other words, the circuitry wired to the terminals A–A′ and B–B′ is such that if the lead 21 were relocated to connect B–B′ by circumventing the terminal A this would result in crossovers. For example, if the lead 21 were relocated to the south of terminal A′, it would cross over the leads 11 and 13 which are also connected to the terminal A′, and in like manner if the lead 21 were relocated to the north to circumvent terminal A, it would cross over the lines 15 and 17. From FIGURE 1, it can be seen that if the lead 19 were relocated to circumvent B and B′, it too would cut across other leads. Therefore, we must assume that in the system represented by FIGURE 1 the only connection between B and B′ and A and A′ which can be made is a connection as shown and would require a crossover which we have defined as an essential crossover.

As suggested earlier it should be noted here that although in the illustrative embodiment, the lines 19 and 21 have been identified as electrical wires, these lines represent any form of energy transmission media, such as ducts to transmit air in a pneumatic logic system.

Presently cross-overs are handled in a point-to-point wiring scheme on the backboard by simply overlaying the connector media, the wires. Such an arrangement does give rise to an occasional short circuit, and an occasional spurious signal, but the more undesirable aspect of this arrangement is the human error and difficulty in fabricating such an arrangement. The cross-over, per se, gives rise to no greater problems (other than those mentioned above) than the hand wiring scheme as a whole. The hand wiring schemes are space consuming; lead to human errors in making such connections; are difficult to service; and as the available space shrinks (as with airborne equipment) are almost impossible to fabricate. Hence the interconnecting art has moved to printed circuit multi-layer devices to take the place of the interconncting wires.

In printed circuit multi-layer schemes the cross-over, per se, often becomes a problem. There are serious problems in the reliability in forming a conducting path through a substrate, or substrates, to complete connections from one terminal to another via a lower layer or a layer lying away from the layer adjacent the backboard. A great deal of engineering and research effort is being spent to improve this reliability. However, multi-layer printed circuit wiring, whatever its advantages over hand wiring, does not appear to be feasible as a means for interconnecting integrated circuits, especially when the integrated circuits are formed as one integral mass. It would be ideal if integral circuits, represented by wafers of semi-conductor material could be connected together on the same plane to which they are mounted.

Consequently, the present invention deals with the problem of how to connect the terminals B to B′ and A to A′ as viewed in FIGURE 1 without employing the cross-over shown in FIGURE 1. As mentioned earlier it is to be understood that while the present invention is described in connection with electrical circuits, other forms of energy transmission can take advantage of this invention. For instance, in a pneumatic system the present invention would have real utility in enabling a stream of air to pass from A to A′ without having to tunnel a pair of ducts at the cross-over point.

Returning to the description of the electrical mode, the logic circuit to connect the four terminals A–A′ and B–B′ will be described as being made up of three exclusive OR gates which in turn will be described as being made up of NAND gates. However, it should be understood that other forms of logic can be used to accomplish the basic principle of a right angular transmission of a signal, or signals, to accomplish an effective transmission of signals through a cross-over position. To be more specific, the present invention while described in connection with exclusive OR gates and NAND gates should be considered as not limited to these logical circuit arrangements.

Figures 2, 3:
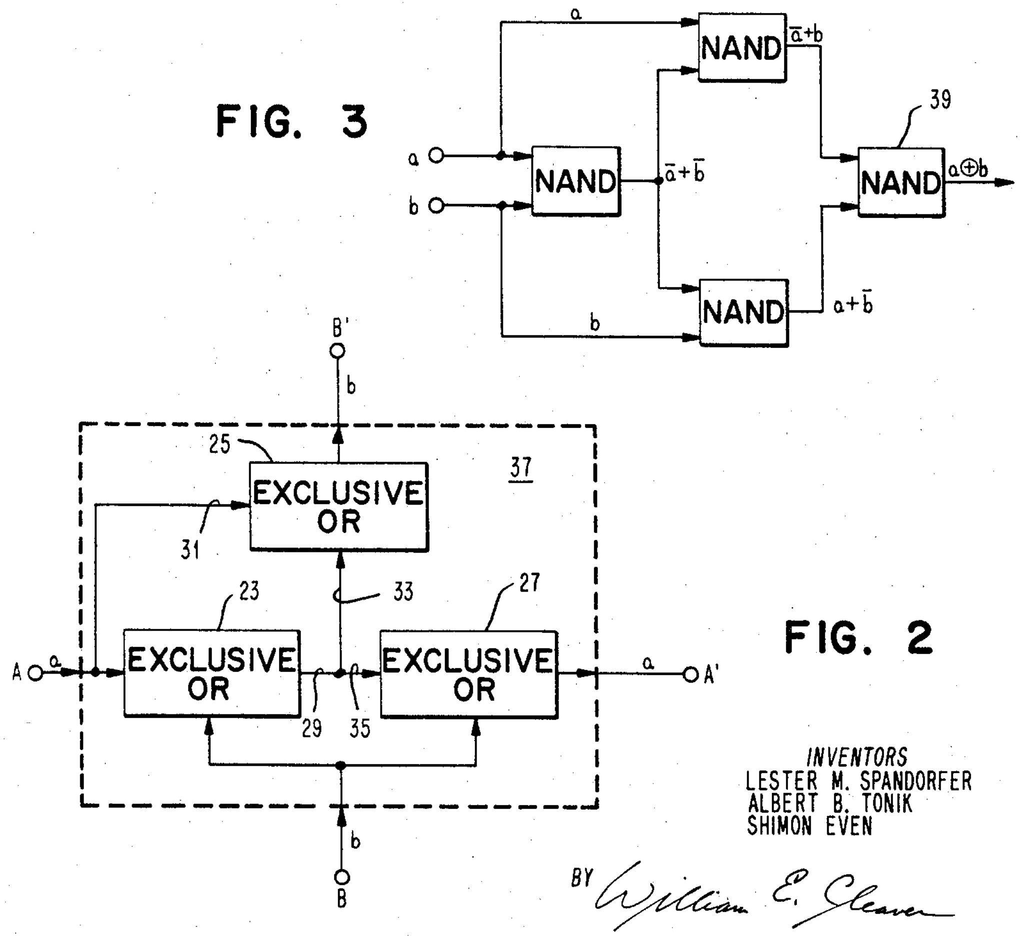
FIGURE 2 is a schematic diagram of a logic device to be connected between four terminals of an essential crossover.
FIGURE 3 is a schematic diagram of one embodiment of a device which can be employed for the logic elements of FIGURE 2.

Consider FIGURE 2 which shows a typical arrangement be included in the logical device connecting the terminals A–A′ and B–B′. In the logical block 37 there are shown three exclusive OR gates 23, 25 and 27. It will be recalled that the truth table for an exclusive OR gate is as follows.

| | | | | | |
|---|---|---|---|---|---|
| Input | a | 0 | 1 | 0 | 1 |
| | b | 0 | 0 | 1 | 1 |
| Output | s | 0 | 1 | 1 | 0 |

In accordance with the foregoing truth table, if a signal *a* is applied to the exclusive OR gate 23 and there is no signal *b* present, then the signal *a* will appear on the lines 29, 31, 33 and 35. When the signal *a*, appears on lines 31 and 33 the exclusive OR gate 25 will not produce an output to the terminal B′ in accordance with the truth table. On the other hand when the signal *a* appears on line 35 and is transmitted to the exclusive OR gate 27, which at the same time is not subject to the signal *b*, there will be produced an output signal from the exclusive OR gate 27 to the terminal A′. Accordingly an *a* signal can be transmitted from the terminal A to the terminal A′.

In a symmetrical fashion it can be found that when the signal *b* is transmitted from the terminal B to the exclusive OR gates 23 and 27 it will find its way through the network to the terminal B′ and will not be transmitted to the terminal A′. Hence a signal *b*, in the absence of a signal *a*, can be transmitted from terminal B to terminal B′. The last case we need consider is what happens when the signals *a* and *b* are transmitted simultaneously. If the signals *a* and *b* are present, the exclusive OR gate 23 is inhibited and there is no output signal on the lines 29, 33 and 35. However, an *a* signal is transmitted on line 31 to the exclusive OR gate 25, which has this *a* signal as the only input thereto, and therefore this signal is transmitted to the terminal B'. In a similar manner, the signal *b* is transmitted to the exclusive OR gate 27, which has only this one input signal thereto and therefore is transmitted to the terminal A'. The above described right-angular signal transmission effectively transmits a signal from B to B' and from A to A' simultaneously because the signals, per se, have no identification other than a uniform pulse and the pulses applied and transmitted throughout the system are equal. Hence while the *a* signal actually activates the exclusive OR gate 25 to produce a *b* signal at B' the circuitry receiving the signal at B' receives the signal as a *b* signal. In a like manner the circuitry at terminal A' receives the signal thereat as an *a* signal, although it has been initiated by a *b* signal. It should be clearly understood that the only time that a signal is transmitted to terminal B' as a result of an *a* signal initiation is when, in fact, a *b* signal has been transmitted from the terminal B, and hence the effective transmission of the signal from B to B' and from A to A' is in order.

It becomes clear from the foregoing that the logic circuitry 37 can be connected for every essential cross-over position and provide a planar connection between any four terminals defining the essential cross-over position in a system.

In order to carry the fabrication of the logic design one step further let us consider what forms of circuitry might be employed to provide a planar (that is, no cross-over) exclusive OR gate. Consider the circuitry of FIGURE 3. FIGURE 3 shows four NAND gates which are connected in a pattern to provide an exclusive OR gate. The NAND gates can be the diode-transistor logic as disclosed in U.S. patent application No. 524,062. The Boolean Algebra symbols are shown on the leads from the NAND gates which eventually provide an output from NAND gate 39 when there is an input of either *a* or *b*, but not in the presence or absence of these input signals. The circuitry shown in FIGURE 3 is shown by way of example only, and should not be considered as the only manner in which a planar exclusive OR gate can be designed. The use of the NAND gate in the circuitry of FIGURE 3 seems to be in order since the universality of the NAND gate is widely known, and widely used, in the fabrication of complete computer circuits.

Figure 4:
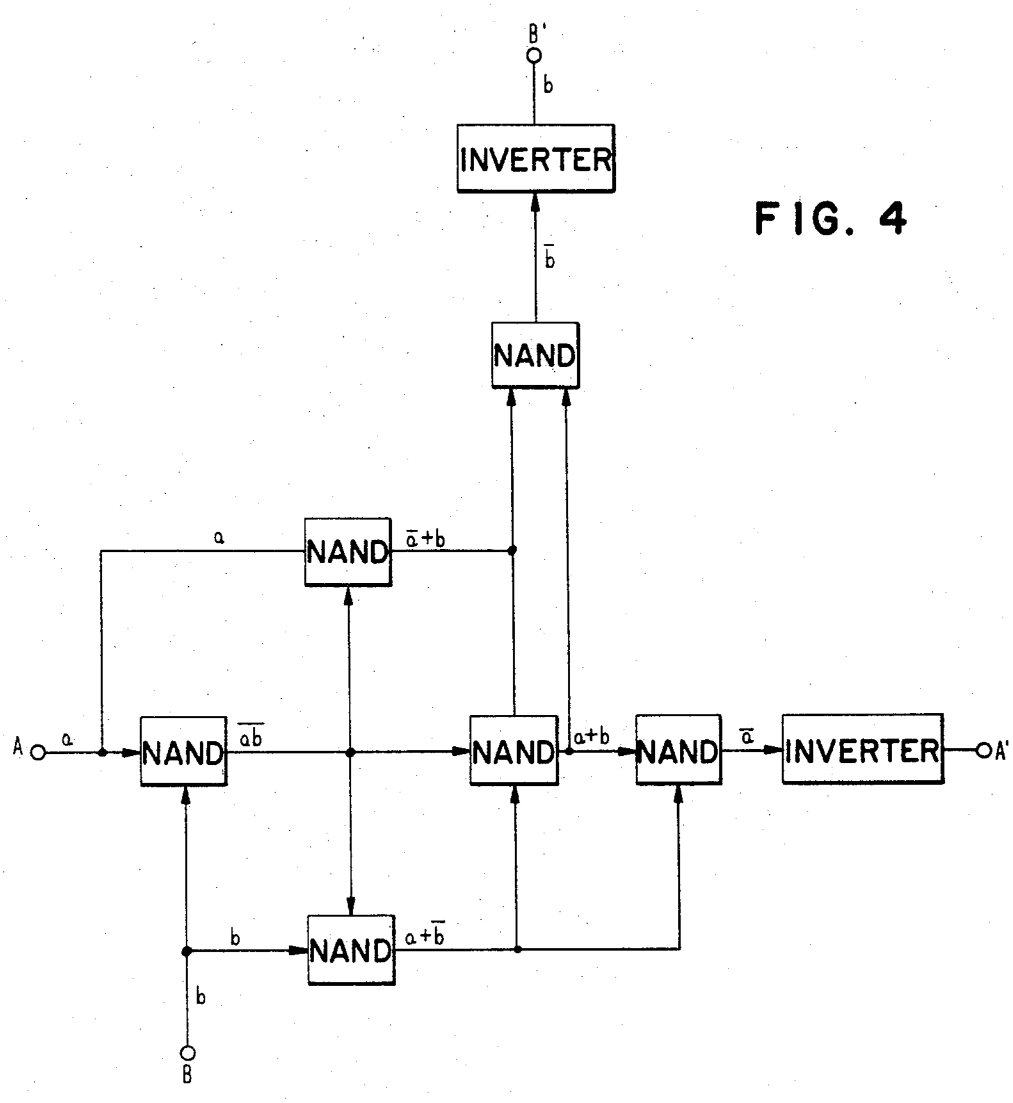
FIGURE 4 is a schematic diagram of a second embodiment of a device which can be employed for the logic elements of FIGURE 2.

In another form of logic a substitute for three exclusive OR gates of FIGURE 2 can be developed with eight NAND gates or six NAND gates and two inverters as shown in FIGURE 4. The Boolean Algebra notations are shown in FIGURE 4 on the output lines of the logic devices, and can be readily followed to show that a signal *b* can be transmitted to B' from B at the same time that signal *a* can be transmitted to A' from A without a cross-over.

Since the present invention makes it apparent that an essential cross-over can be eliminated by substituting logic circuitry, it becomes obvious that essential cross-overs can be eliminated by re-designing the minimum logic of the logic network. That is to say, for any given function, there is a minimum number of particular gates which are necessary to accomplish the function under specified constraints. The characteristics of the gates (which are considered as necessary and minimum) can be changed in order to reduce or eliminate cross-overs. Accordingly, then, an essential cross-over is to be further understood to include any over laying of signal paths which would ordinarily result while employing the minimum number of gates necessary to simply accomplish the function as might be dictated in accordance with any general logic design technique, such as Boolean Algebra. To re-phrase the foregoing, let it be understood that if a multi-terminal network is connected in a planar mode (i.e. not in a multi-layer configuration) without cross-overs, but if that network would have had inherent cross-overs if the network had simply been designed to accomplish the function, (with a minimum number of gates), and such inherent cross-overs have been eliminated by changing the characteristics or design of the logic circuits normally involved then such a network is considered to be within the spirit of this invention. Such inherent cross-overs are considered to be within the definition of an essential cross-over. Planar network is not to be considered limited to a flat plane.

It is the intent of this invention to provide a means by which logic changes, whether they be the addition of more logic elements or the change of logic elements per se, can be employed to overcome cross-overs.

Figures 5, 6:
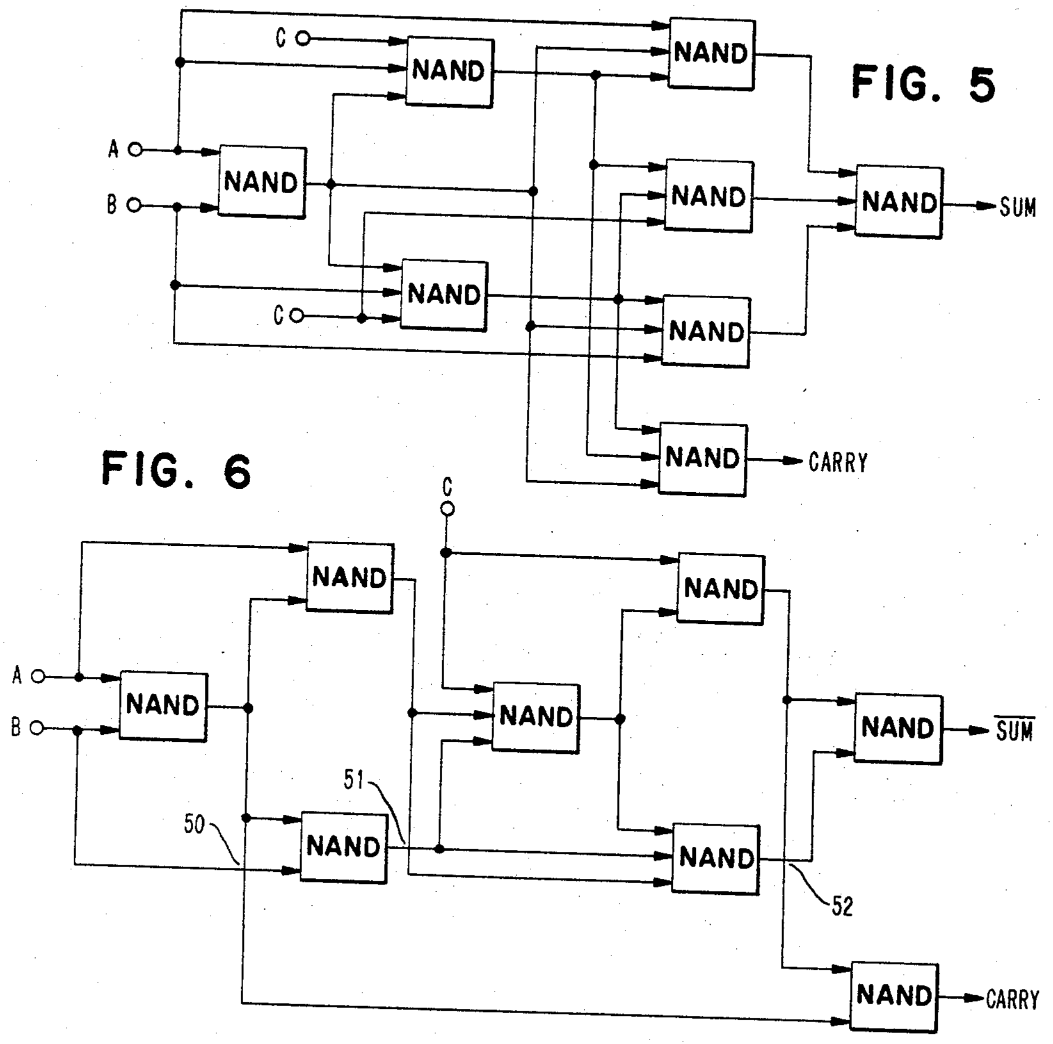
FIGURE 5 is a schematic diagram of a conventional full adder employing the minimum number of gates in accordance with a standard design.
FIGURE 6 is a schematic diagram of the full adder of FIGURE 5 with the wiring rearranged so that there is a reduction in the crossovers.

Consider FIGURE 5. FIGURE 5 shows a conventional and minimum gate logic for a full adder. It has been exhaustively proven that it is necessary to have at least eight NAND gates to effect a full adder logic operation. In FIGURE 5 there are shown eight NAND gates and if the proper pulses are applied the inputs A, B, and C, (C simply being shown as a double input), it will be found that: (1) for the presence of A, B and C we get both a sum and a carry; (2) for the presence of simply A, B we get zero sum and we get a carry; and (3) for the presence of any one of A, B or C we get simply a sum.

FIGURE 6 shows the full adder with the wiring rearranged so that there are only three cross-overs in particular at points 50, 51 and 52. If there is a careful comparison made between the network of FIGURE 6 and that of FIGURE 5 we find that we have reduced the number of cross-overs by twelve. Now the configuration of FIGURE 6 is as great a reduction as we can attain in the number of cross-overs by the method of rewiring, or rerouting, the signal paths.

Figure 7:
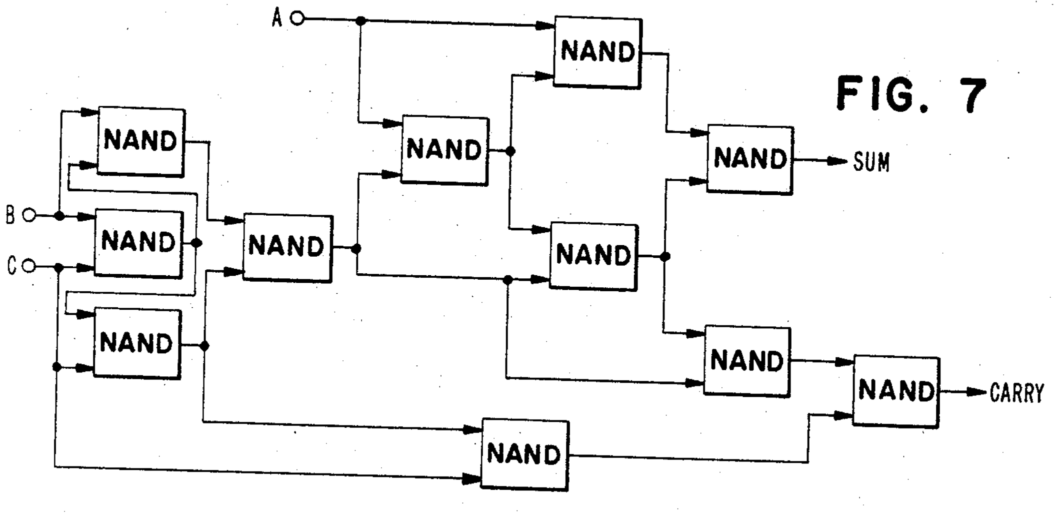
FIGURE 7 is a schematic diagram of the full adder with additional logic to eliminate the crossover shown in FIGURE 5 and FIGURE 6.

FIGURE 7 shows the full adder with no cross-overs. The cross-overs have been eliminated by substituting logic elements therefore in accordance with the teaching of this invention. It can be noted in FIGURE 7 that there are eleven NAND gates or an increase of three NAND gates of the NAND gates of FIGURE 6. The three additional NAND gates are employed to eliminate the three cross-overs represented by the cross-overs 50, 51 and 52 of FIGURE 6.

It should be readily apparent that the NAND gates shown in FIGURE 6 or FIGURE 5 per se might be internally changed, or expanded, so that instead of providing three separate NAND gates as shown in FIGURE 7, the logic elements of FIGURES 5 or 6 simply take on other characteristics in addition to being NAND gates which other characteristics enable the essential cross-overs to be eliminated.

According then to the present invention there can be employed at each essential cross-over in an interconnection network a logic device which will effect a right angle energy signal transmission between adjacent terminals of a four-terminal essential cross-over position in order to effect an energy signal transmission between the opposite terminals of the four-terminal array. Such an arrangement makes it possible to simply and economically fabricate an entire interconnecting system on one surface. The techniques of printed circuits are well known and the present invention lends itself to fabricating the entire interconnecting network (without the logic devices) by printed circuits on one surface of a substrate. It follows that the requirement of providing backboard wiring or substituting multi-layered printed circuits therefor can be eliminated. Circuit components and sub-assemblies can be connected together via the same plane upon which they are mounted. Such an arrangement lends itself to great utility with respect to integrated circuits wherein the sub-assemblies are fabricated as wafers of semiconductor material.

While the foregoing description sets forth a principle of the invention in connection with specific apparatus, it is to be clearly understood that this description is made only by way of example and not as a limitation to the scope of the invention as set forth in the objects thereof and in the accompanying claim.

The embodiments of the invention in which an exclusive property or privilege is claimed are defined as follows:

1. A network to accomplish a logic function for intelligent signals comprising:
(a) a plurality of logic circuit means which represent the necessary logic circuit means to be connected together to effect said function, said logic circuit means when connected together to effect said function including at least first and second circuit paths which represent an essential crossover circuit;
(b) first, second, third and fourth circuit connections, said first and second circuit connections disposed to represent said first circuit path and said third and fourth circuit connections disposed to represent said second circuit path;
(c) further logic means connected to said first, second, third and fourth circuit connections and capable of transmitting intelligent signals from said first circuit connection to said second circuit connection in response to a condition of a signal at said first circuit connection and no signal at said third circuit connection, and capable of transmitting an intelligent signal from said third circuit connection to said fourth circuit connection in response to a circuit condition wherein there is an intelligent signal present at said third circuit connection and no intelligent signal present at said first circuit connection and further capable of passing an intelligent signal from said first circuit connection to said fourth circuit connection and from said third circuit connection to said second circuit connection in response to intelligent signals being present in coincidence at respectively said first and third circuit connections, said further logic means being connected to said first, second, third and fourth circuit connections along a single surface;
(d) circuitry means connecting said plurality of logic circuit means along a single surface.

References Cited

Curtis, H. A.: The Design of Switching Circuits, Van Nostrand, N.Y., 1962, pp. 324–325.

ARTHUR GAUSS, *Primary Examiner.*

J. D. FREW, *Assistant Examiner.*